United States Patent [19]
Chen et al.

[11] Patent Number: 5,864,372
[45] Date of Patent: Jan. 26, 1999

[54] APPARATUS FOR IMPLEMENTING A BLOCK MATCHING ALGORITHM FOR MOTION ESTIMATION IN VIDEO IMAGE PROCESSING

[75] Inventors: Hong-Yi Chen; Qing-Ming Shu, both of Beijing, China

[73] Assignee: United Microelectronics Corporation, Taiwan, China

[21] Appl. No.: 763,089

[22] Filed: Dec. 10, 1996

[51] Int. Cl.$^6$ .................................................. H04N 7/32
[52] U.S. Cl. .......................................... 348/699; 348/416
[58] Field of Search .................................. 348/699, 416, 348/402, 700, 701, 407, 413; H04N 7/32

[56] References Cited

U.S. PATENT DOCUMENTS

| | | | |
|---|---|---|---|
| 5,561,475 | 10/1996 | Jung | 348/699 |
| 5,604,546 | 2/1997 | Iwata | 348/699 |
| 5,608,458 | 3/1997 | Chen et al. | 348/416 |
| 5,652,625 | 7/1997 | Chen et al. | 348/699 |
| 5,719,642 | 2/1998 | Lee | 348/699 |

OTHER PUBLICATIONS

Li et al, "A New Three–Step Search Algorithm for Block Motion Estimation", IEEE Trans. on Circuits and Systems for Video Technology, vol. 4, No. 4, pp. 438–442 Aug. 1994.

Jehng et al, "An Efficient and Simple VLSI Tree Architecture for Motion Estimation algorithms", IEEE Trans. on Signal Processing, vol. 41, No. 2, pp. 889–900 Feb. 1993.

Gupta et al, "Architectures for Hierarchical and Other Block Matching Algorithms", IEEE Trans. on Circuits and Systems for Video Technology, vol. 5, No. 6, pp. 477–489 Dec. 1995.

*Primary Examiner*—Tommy P. Chin
*Assistant Examiner*—Vu Le
*Attorney, Agent, or Firm*—Rabin & Champagne, P.C.

[57] ABSTRACT

An apparatus for implementing block matching for motion estimation in video image processing. The apparatus receives the pixel data of an original image block and the pixel data of a compared image block selected from a number of compared image blocks during video image processing. The selected image blocks are compared to determine a movement vector. The apparatus has a multi-stage pipelined tree-architecture that includes four stages. The first computational stage produces corresponding pairs of difference data and sign data. A second compression stage in the process pipeline includes a compression array that receives all the difference data and sign data, which are added together to produce compressed summation data and compressed sign data. The third summation stage in the pipeline receives the compressed summation and sign data and produces a mean absolute error for the original and compared image block pixels. A last minimization stage receives the mean absolute error for each of the compared image blocks and determines a minimum mean absolute error from among them. The compression array includes of a number of full and half adders arranged in a multi-level configuration in which none of the adder operand inputs and the carry-in inputs is left un-connected.

12 Claims, 8 Drawing Sheets

APPARATUS FOR IMPLEMENTING A BLOCK MATCHING ALGORITHM FOR MOTION ESTIMATION IN VIDEO IMAGE PROCESSING

BACKGROUND OF THE INVENTION

1. Field of the Invention

The invention relates in general to a processing hardware configuration for manipulating video image data for compression. In particular, the invention relates to a processing hardware configuration for efficiently implementing a fast search motion estimation algorithm in a semiconductor device that has reduced physical dimensions and complexity.

2. Description of the Related Art

Video signal compression is an important technique for successful video signal processing in video equipment such as high definition television, video telephone, and video conference systems. Because video imaging systems process vast amounts of digital data, maintaining a data bit rate that is extremely low in the signal processing flow by utilizing a data compression technique becomes an important factor for smooth video signal processing. To achieve a low data bit rate in the video signal processing flow, in other words, to obtain a very high data compression ratio, good codec (coding-decoding) schemes and corresponding hardware systems are essential. Such codec systems typically implement schemes including motion compensation, digital cosine transform, and quantization of the weight of visual characteristics, as well as Huffman coding, and others.

Essentially, motion compensation is a scheme which greatly affects the data compression ratio achieved in video image compression coding systems. This technique is used to manipulate the video signal data compression based on the specific time domain statistical characteristics of the subject video image signals. Unlike situations where successive still images are processed, a video image is characterized by the fact that two successive video images frequentely have relatively few differences when corresponding constituent blocks in successive video image frames are compared. This is an advantageous characteristic of video images that allows implementation of a motion compensation scheme to achieve a high data compression ratio.

Motion estimation provides the basis for a motion compensation technique. Good motion estimation results are determined by the precision, speed, and efficiency achieved by the motion estimation scheme. Various algorithms are available for implementing motion estimation. Block matching is an algorithm that is one of the easiest to implement from a hardware perspective, because of its simple steps and rules for implementation. Commonly used block matching algorithms include, for example, full search algorithms (FSA), three-step search algorithms (TSSA), two-dimensional logarithmic search algorithms (TDLSA), cross search algorithms (CSA), orthogonal search algorithms (OSA), and hierarchical search algorithms (HSA), among others.

Algorithms, of which TSSA is representative, that implement a video image block matching operation in a sequence of multiple procedural steps, involve greatly reduced amount of computation, since not all blocks that may have been displayed are compared. However, these algorithms require that subsequent process steps be performed in a defined procedural step sequence. This is a processing requirement that is not suitable for parallel processing. As a result, relatively very high throughput, low latency, and programmability are factors which must be considered if implementation of this category of motion estimation algorithms is to be sucessful.

Tree-architecture is an ideal hardware configuration for implementing such a motion estimation algorithm. However, conventional tree architectural configurations require the use of a large number of process elements for substantial implementation. High latencies are thus produced in the process pipelines, constaining the processing clock rate. For the purpose of outlining the characteristics of the invention, an example of such a conventional tree-architecture using four channels is briefly examined below, with reference to the accompanying drawings.

Block matching algorithms employ a scheme for computing the mean absolute errors (MAE) in the compared video image blocks as the basis for the measurement of the level of image matching. Blocks with a minimum MAE are considered to be matched blocks. In practice, an MAE for a compared image block is determined by first summing all the absolute values of the characteristic value differences between all picture pixels in the original image block and picture pixels in the corresponding compared image block, and then dividing the summed absolute value by the total number of pixels in the processed image block. The characteristic value of the picture pixels to be differentiated among the compared image blocks is normally the intensity value of the displayed pixel. By definition, an original block of a video image is the one currently being processed, while its corresponding compared block is the same video image block after it undergoes image motion alterations. It is assumed that both the original block and the compared block consist of the same number of image pixels arranged in the same matrix. Thus, a hardware configuration for implementing such a block matching scheme involving the computation of the MAE must at least include circuitry elements capable of performing addition, subtraction, absolute value operations, and determination of the minimum in a series of values.

FIG. 1 schematically depicts a conventional four-channel tree-architecture for implementing the computation of an MAE in a block matching algorithm. It is assumed that both the original block and the compared block consist of four pixels. Each of the pixels in the original block and the compared block is represented numerically by display characteristic values, designated by the data values X1, X2, X3, and X4 and Y1, Y2, Y3, and Y4, respectively, fetched to the input end of the tree-architecture for processing, as shown in the drawing. Each of the pixel data values may be multi-bit data containing, for example, n bits. Thus, pixel data for the original and compared blocks may be expressed as:

$$X=\{x_{n-1}, x_{n-2}, \ldots, x_0\} \text{ and}$$
$$Y=\{y_{n-1}, y_{n-2}, \ldots, y_0\}$$

wherein the $x_{n-1}$ and $y_{n-1}$ bits are the sign bits for the pixel data of the original and compared blocks, respectively, and the X and Y data may thus all be positive values.

The four-channel tree-architecture shown in FIG. 1 consists of a total of five computational stages that are functionally organized into four sections. It is assumed that each of the five computational stages requires one clock cycle to implement a computational result for provision to the successive stage in the process pipeline. In other words, the tree-architecture of FIG. I takes at least five clock cycles to complete the block matching operation, utilizing the sets of input pixel data X and Y.

The first functional section in the tree-architecture structure is the absolute difference section 100, which consists of four parallel computational members 105. Each of the four computational members 105 is required to determine the value |X−Y|, or, specifically, to determine the absolute value of the difference between the X and Y pixel data values for each of the four pixels of the processed image block.

The second functional section subsequent to the absolute difference section 100 is the summation section 110, which includes two successive computational stages 112 and 114. Two parallel adder members 118 are arranged in the first computational stage 112, while one adder member 119 is in the second stage 114. Each of the adder members 118 in the stage 112 adds the outputs of two of the parallel computational members 105 in the first section 100. The outputs of the two adder members 118 in the computational stage 112 are then added together in the subsequent stage 114 by the adder member 119. Thus, the output of the summation section 110 is the summation of the four absolute values of the difference between the original and compared image blocks obtained in the absolute difference section 100.

The third functional section is an accumulation section 120 that consists of at least a single accumulating adder member 125. This is an independent adder member that adds the output of the up-stream functional section 110 to the value it already holds. When the video image blocks to be processed consist of a pixel matrix having more than four pixels, this accumulation section 120 can be controlled under proper resetting and output enabling schemes to process four pixels at a time. However, the depicted conventional tree-architecture, which can easily process four pixels in a pipeline, would require more clock cycles when the processed image blocks are larger than one multiple of four pixels.

Finally, in the last functional section, a minimum determining member 135 constitutes the minimum determining section 130, which determines the minimum value from among the outputs of the accumulation section 120. Essentially, each of the outputs received from the accumulating adder member 125 is compared to the current minimum value memory content of the minimum determining member 135, and the smaller value is stored as the minimum value in the memory.

Thus, after all the pixels in the processed image block have been processed by the tree-architecture circuitry of FIG. 1, a motion vector 140 may be obtained as the output of the architecture, which is representative of a measure of the relative image movement between the original and compared blocks of the video image.

FIG. 2 shows a schematic diagram of the computational member 105 for the absolute difference section 100 of the tree-architecture of FIG. 1. As shown in the drawing, the computational member receives video block image pixel data inputs X and Y from the original and compared blocks, respectively, for generation of the absolute value difference |X−Y| by the depicted circuitry. Assuming the notation Z=X−Y, |Z|=|X−Y| is therefore determined.

The Y data is provided to the input of an exclusive-OR (XOR) gate 210, the other input of which is tied to a constant logical "1". This is equivalent to obtaining the one's complement 215 of the Y data which is provided to an adder 220 for addition with the X data. Thus, the adder 220 turns out the value X−Y at its S output, while the carry-out bit 224 at the CO output of the adder 220 signifies the sign bit of this effective subtraction performed by the adder. Notice that while the data X and the one's complement of the data Y are added together by the adder 220 to obtain the X−Y value, a carry-in bit (CI) having a constant logical value of "1" is also added into this summation operation, in order to perform subtraction by addition of the two's complement of the data Y.

The summation result of the adder 220, i.e., the X−Y value generally identified by the reference numeral 225, is exclusive-OR-ed by the XOR gate 230, utilizing the inverted version 226 of the carry-out bit 224 of the adder 220 as the conditioning bit. An inverter 222 is used to provide this inverted version of the carry-out bit 224. This allows the one's complement of the value X−Y to be provided to an input of another adder 240 if the inverted carry-out bit 226 of the adder 220 is a logical high. On the other hand, if the inverted carry-out bit 226 is a logical low, the output result of the adder 220 can be directly provided to the B input of the adder 240. The other, A, input of the adder 240 is tied to a constant logical "0". The carry-in input CI of the adder 240 is also driven by the inverted version of the carry-out output of the adder 220.

Such a double-adder arrangement as depicted in FIG. 2 provides the absolute value of the difference between the input X and Y data, which is held in the register 250 for further processing. However, this circuitry has at least the following obvious disadvantages for practical application in the block matching scheme used in video image processing.

First of all, since the absolute difference section 110 requires two cascaded stages of adders to obtain the absolute value result, time latency in the processing pipeline of the tree-architecture for computing the block matching MAE becomes tight. This directly translates into a constraint on the clock frequency that can be applied to the circuit utilizing this architecture.

Secondly, the total number of adders required in constructing the tree-architecture for implementing the computation of a block matching MAE is large and increases greatly with the number of pixels. The number of required process elements increases accordingly. This adds to the overall complexity of semiconductor fabrication.

Thirdly, as the channel number in the architecture is increased to simultaneously process more pixel data, the total number of processing stages in the process pipeline is also increased by one stage. This further increases the time latency in the tree-architecture.

Further evaluation of the second adder 240 of the computational member 105 shown in FIG. 2 for the absolute difference section 100 in FIG. 1 reveals that the adder 240 is used merely to add the logic value at the B input to a constant nil "0" at the A input. As a matter of fact, only the sign bit 226 is added to the carry-in input CI of adder 240. On the other hand, careful examination of the block diagram of FIG. 1 shows that each of the adder members 118 in the summation section 110 of the tree-architecture of FIG. 1 utilized to sum the outputs of two corresponding computational members 105 does not use its carry-in inputs. The second stage adder member 119, which adds the two adder member 118 outputs together, also has a carry-in input that is left unused.

A tree-architecture based on the concept of making use of these idle adder inputs in the process pipeline, known as the hierarchical search algorithm (HSA), as mentioned above, has been developed by the present inventors and is illustrated in the block diagram shown in FIG. 3. Such an architecture is disclosed in U.S. patent application Ser. No. 08/666,987, filed Jun. 19, 1996, which disclosure is incorporated herein by reference. Similar to the architecture of FIG. 1, this is another four-channel tree-architecture design having a total of five processing stages, also similarly categorized into four functional sections. This HSA block image processing circuitry is capable of an improved, smooth pipeline operation. After the initial five clock cycles, a resultant motion vector 140 is generated once every clock cycle.

As shown in the block diagram of FIG. 3, the first functional section, the absolute difference section 300, consists of four parallel computational members 305. An example of an implementation of the computational member 305 is illustrated in the schematic diagram of FIG. 4. Based on the concept of HSA architecture, the computational member 305 can be considered to be a simplification of the member 105 of FIG. 2. This simplification is possible, as mentioned above, by making use of the idle adder inputs in the process pipeline. When compared with the computational member 105 of FIG. 2, it is noted that the member 305 of FIG. 4 includes only one adder, rather than two.

Notice that for the purpose of smooth pipeline operation, registers are assigned to each output of each computational member 305, adder member 318 and 319, and to the accumulating adder member 325. These registers are used to hold the intermediate data and pass the data to the corresponding subsequent stage of elements synchronously, so that smooth pipeline operation can be achieved.

In the second functional section, subsequent to the absolute difference section 300, namely, the summation section 310, two successive computational stages 312 and 314 are included. As in the case of the conventional four-channel tree-architecture shown in FIG. 1, two parallel adder members 318 are arranged in the first computational stage 312, and one adder member 319 is included in the second stage 314. Each of the adder members 318 in the first computational stage 312 adds the outputs of two of the parallel computational members 305 from the first section 300. The outputs of the two adder members 318 in the first occupational stage 312 are then added together in the subsequent stage 314 by the adder member 319. Basically, this is a configurational arrangement equivalent to that of FIG. 1, except that the carry-in inputs of the adder members 318 and 319 are utilized for the summing manipulation required in the process for obtaining the MAE.

Next, the third functional section following the second is an accumulation section 320 that consists of at least a single accumulating adder member 325. This independent adder member 325 adds the output from the summation section 310 to the value it already holds. When the video image blocks to be processed consists of a pixel matrix of more than four pixels, the accumulation section 320 can be used to process four pixels at a time.

In the last functional section, a minimum determining member 335 constitutes the minimum determining section 330. This determines the minimum value from among the outputs of the accumulation section 320. Each successive output of the accumulating adder member 325 received is compared to the current minimum value memory content of the minimum determining member 335, and the smaller value is stored as the minimum in the memory.

In the HSA architecture of FIG. 3, the computational member 305 used in the absolute difference section 300 can be one that is electronically simple compared to its counterpart in the architecture of FIG. 1. As mentioned above, only one, rather than two, adder is require to construct a computational member 305. Approximately one-third of the hardware process elements of the design of FIG. 1 can be eliminated using the HSA design.

However, if the channel number is doubled, such HSA architecture still requires a tremendous increase in the total number of process stages in the pipeline. When the total channel number in the tree-architecture design is increased to a certain point due to practical applications in video image processing, the resulting time latency is increased to a level which greatly reduces the HSA pipeline processing efficiency.

SUMMARY OF THE INVENTION

It is therefore an object of the invention to provide an apparatus for implementing a block matching algorithm for motion estimation in a video image processing device, which has improved time latency characteristics.

It is another object of the invention to provide an apparatus for implementing a block matching algorithm for motion estimation in a video image processing device, which has a reduced device surface area requirement when implemented in a semiconductor integrated circuit.

The invention achieves the above-identified objects by providing an apparatus for implementing block matching for motion estimation in a video image processing system. The apparatus receives the pixel data from an original image block and the pixel data from a compared image block selected from a number of compared image blocks during video image processing. The selected image blocks are compared to determine a movement vector. The apparatus has a multi-stage pipelined tree-architecture design that includes four stages. The first computational stage produces corresponding pairs of difference data and sign data. A second compression stage in the process pipeline includes a compression array that receives all the difference data and sign data, which are added together to produce compressed summation data and compressed sign data. The third summation stage in the pipeline receives the compressed summation and sign data and produces a mean absolute error for the original and compared image block pixels. A last minimization stage receives the mean absolute error for each of the compared image blocks and determines a minimum mean absolute error from among them. The compression array includes a number of full and half adders arranged in a multi-level configuration in which none of the adder operand inputs and the carry-in inputs are left un-connected. Semiconductor IC devices implementing the circuit configuration have a reduced surface area and improved signal propagation time latency in the process pipeline.

BRIEF DESCRIPTION OF THE DRAWINGS

Other objects, features, and advantages of the invention will be apparent by way of the following detailed description of the preferred but non-limiting embodiments. The description is made with reference to the accompanying drawings in which.

DESCRIPTION OF THE PREFERRED EMBODIMENTS

Figure 1:
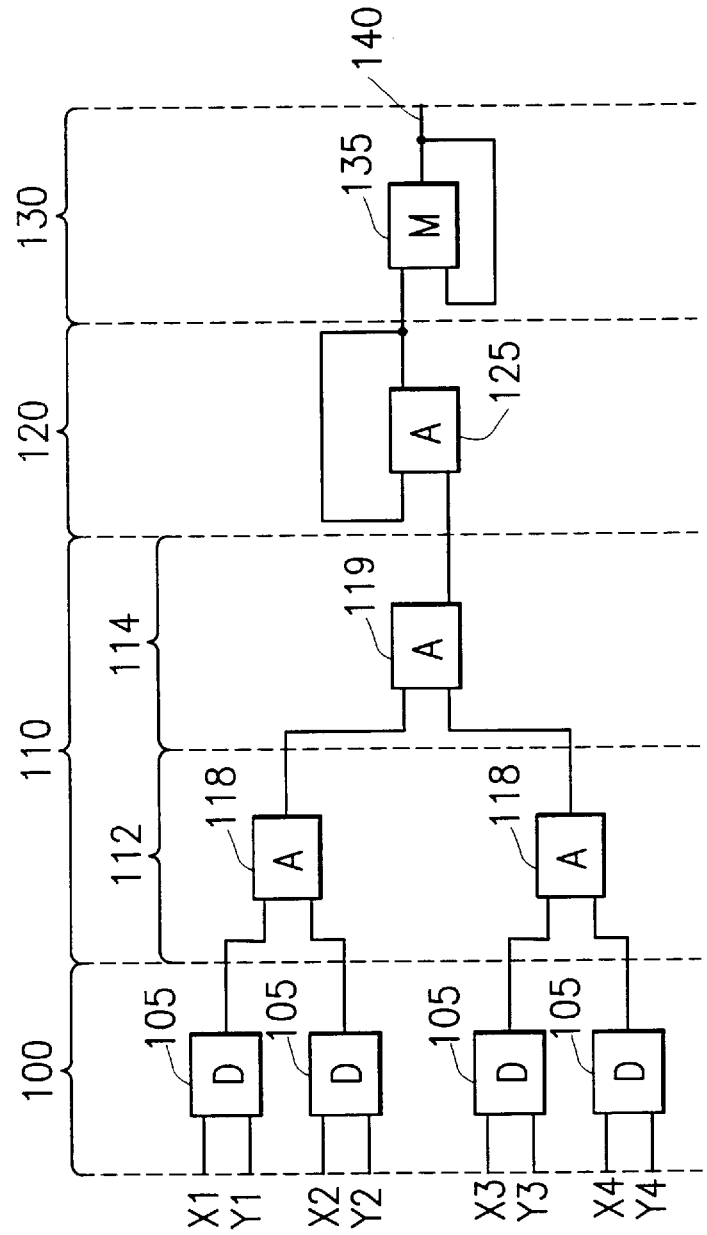
FIG. 1 is a block diagram of the hardware configuration of a four-channel conventional tree-architecture design for video image processing.

As mentioned, a block matching algorithm is the implementation of a scheme for comparing an original video image to the compared one, which is normally the image immediately preceding the original one. In the following description of the preferred embodiment of the invention, the compared images, which are frames of an entire digital video image screen, are divided into a number of blocks organized in a matrix of predetermined vertical and horizontal dimensions. For example, the video image screen can be divided into a matrix of N horizontal by N vertical blocks, a total of N×N blocks. Each of the blocks of video image to be processed in turn includes a matrix of pixels.

Assuming there is a maximum possible amount of image object shift of w pixels in the processed original block of image with respect to the compared one, then a range of ±w pixels next to the processed original block is set as the search area for the purpose of applying the block matching algorithm. Within a short period of time after the original block is received, a number of N×N blocks in the image search area are then designated as the possible comparison image blocks. The block matching error for the original and compared image block pair is then calculated, and the corresponding image shift amount in the image block having the minimum matching error is the calculated movement vector in the original image block.

One of the most widely used standards for measuring the matching error using such a video image block matching algorithm implementation is the mean absolute error, MAE, as mentioned above. Expressed mathematically, there is a function $$F(k,l) = \sum_{i=1}^{N} \sum_{j=1}^{N} |X(i,j) - Y(i+k, j+l)| \quad (1)$$

wherein $-w \leq k, l \leq w$;

X is the pixel data of the original image block;

Y is the pixel data of the compared image block; and (k, 1) represents the image shift amount of the compared image block with respect to the original image block. Thus, the movement vector MV sought to be determined can be expressed as $$MV = (k, 1) | minMAE(k, 1) \quad (2)$$

Based on equations (1) and (2), computation procedures can be implemented to search for the specific compared image block featuring the minimum MAE when compared to the original image block. The amount of image shift in this searched block is the designated movement vector for the processed image block.

For the description of the preferred embodiment of the invention, it is assumed that the original and compared image blocks are both N×N-pixel blocks. Image data for the original block is expressed as X1, X2, ..., X(N×N), and image data for the compared block is expressed as Y1, Y2, ..., Y(N×N). Further, it is assumed that the pixel data has a format of n bits, expressedly, $$X = \{x_{n-1}, x_{n-2}, \ldots, x_0\}, \text{ and}$$

$$Y = \{Y_{n-1}, Y_{n-2}, \ldots, y_0\},$$

wherein $x_{n-1}$ and $y_{n-1}$ are sign bits for the X and Y pixel data. Since the sign bit is included as one of the data bits, X and Y are always positive values.

Let Z=X−Y. Since X and Y are both positive values, Z is also data having n bits, and can be expressed as $$Z = \{z_{n-1}, z_{n-2}, \ldots, z_0\},$$

wherein $z_{n-1}$ is the sign bit for the Z data.

A binary number $S = \{S_{n-1}, S_{n-2}, \ldots, S_0\}$ having a sign bit $s_{n-1}$ included in the data bits is manipulated to obtain its two's complement −S as follows:

$$-S = \sum_{i=0}^{n-1} (s_i \oplus 1) \cdot 2^i + 1 \quad (3)$$

Figure 4:
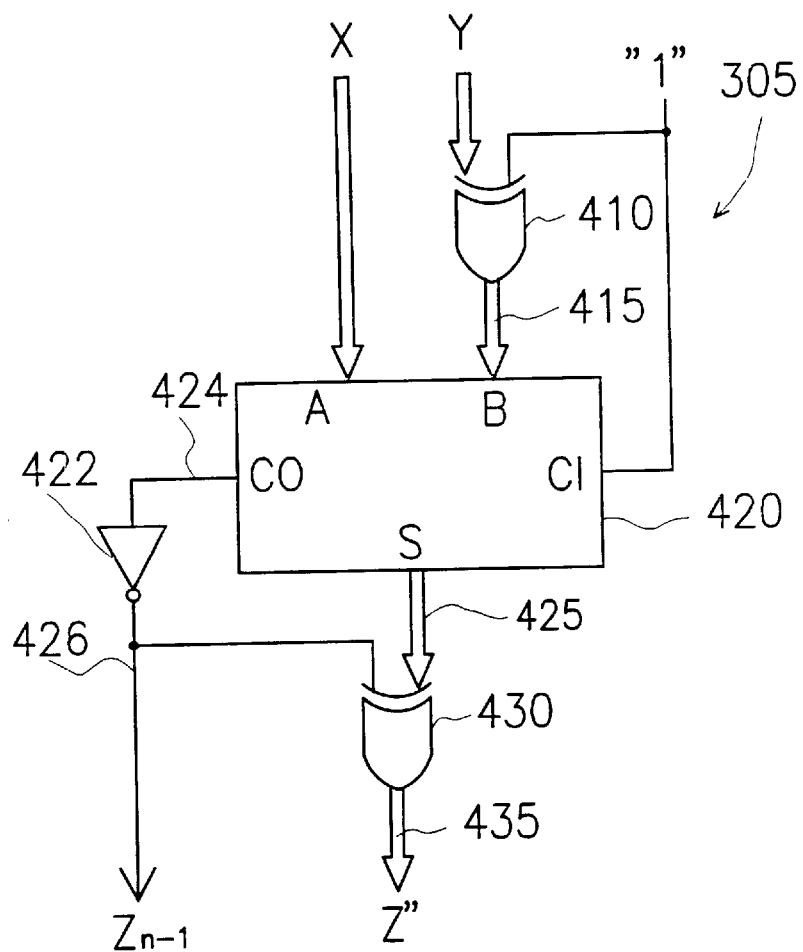
FIG. 4 is a schematic diagram of the computational member of the HSA tree-architecture of FIG. 3, used to perform an absolute difference operation for the original and the compared image blocks processed.

When physically implemented in hardware circuitry, this is equivalent to exclusively OR-ing S with a binary 1 and then adding binary 1 to the XOR-ed result. Thus, $$Z = X - Y = \left\{ \sum_{i=0}^{n-1} (y_i \oplus 1) \cdot 2^i + 1 + \sum_{j=0}^{n-1} x_j \cdot 2^j \right\}, \quad (4)$$

which, in the form of hardware circuitry, is the S output 425 of the adder 420 in the circuit of FIG. 4.

Then, |Z| can be determined as follows. If the sign bit $z_{n-1}=1$, then $$|Z| = \sum_{i=0}^{n-1} (z_i \oplus 1) \cdot 2^i + \quad (5)$$

if, however, $Z_{n-1}=0$, then there is $$|Z| = \sum_{i=0}^{n-1} (z_i \oplus 0) \cdot 2^i + 0 \quad (6)$$

Thus, $$|Z| = \sum_{i=0}^{n-1} (z_i \oplus z_{n-1}) \cdot 2^i + z_{n-1} \quad (7)$$

In terms of a process algorithm, determination of the binary value |Z|=|X−Y| can be outlined in the following procedural steps:

a. Obtain the two's complement of the Y data by first obtaining the one's complement of Y and then adding 1. In effect, this is digitally equivalent to inverting Y and then adding 1.

b. Add the two's complement of the Y data to the X data using an adder, thereby obtaining the data Z.

c. When $Z_{n-1}=1$, signifying negative Z data has been obtained, or, in other words, that Y>X, the two's complement of the Z data must further be obtained to calculate |Z|, by first obtaining the one's complement thereof and then adding 1. When $Z_{n-1}=0$, signifying positive Z data has been obtained, or, in other words, that Y<X, the positive value of Z is therefore equal to |Z|, and requires no further processing.

Thus, according to equation (7), the absolute value |Z| can be obtained by summing $$\sum_{i=0}^{n-1} (z_i \oplus z_{n-1}) \cdot 2^i$$

and the image data bit $Z_{n-1}$ together. While the image data bit $Z_{n-1}$ is in effect the sign bit for the data Z, it can be added into the summation at a later time, after the time at which the other term of the summation operation is determined.

Figure 2:
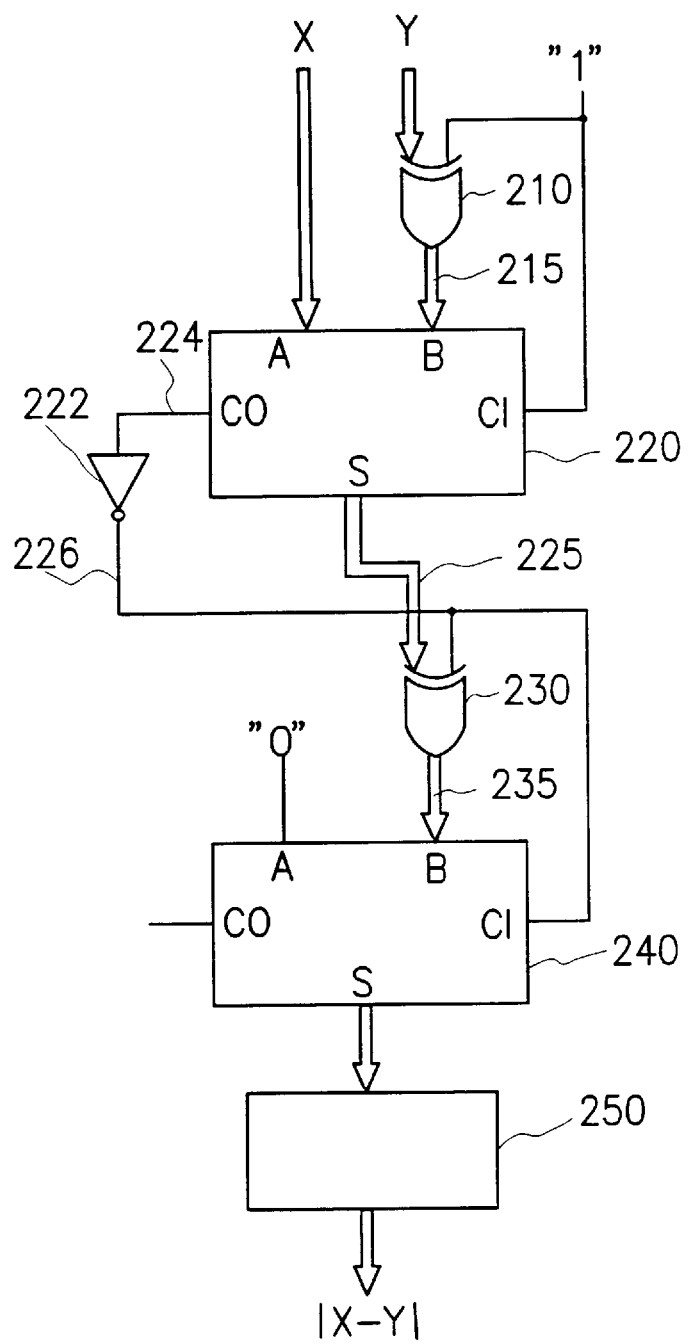
FIG. 2 is a schematic diagram of the computational member of the tree-architecture of FIG. 1, used to perform an absolute difference operation for the original and compared image blocks processed.

Referring back to FIG. 2 of the drawings, wherein the computational member of the conventional tree-architecture was used to obtain the result of equation (7), note that the adder 240 has one data input tied to a constant logical 0, while the carry-in input is fed by the carry-out output 226 of the adder 220 of the previous section. Since, as mentioned above, this carry-in input can be implemented at a later time, the adder 240 of the computational member of FIG. 2 can be eliminated altogether, and the computational member can be realized by the configuration shown in FIG. 4. The output Z" of the XOR gate 430 is the temporary data for the computed data |X−Y|. This data is sent to the next processing stages in the tree-architecture together with the sign bit data $z_{n-1}$ generated at the inverter 422 for later processing.

Figure 5:
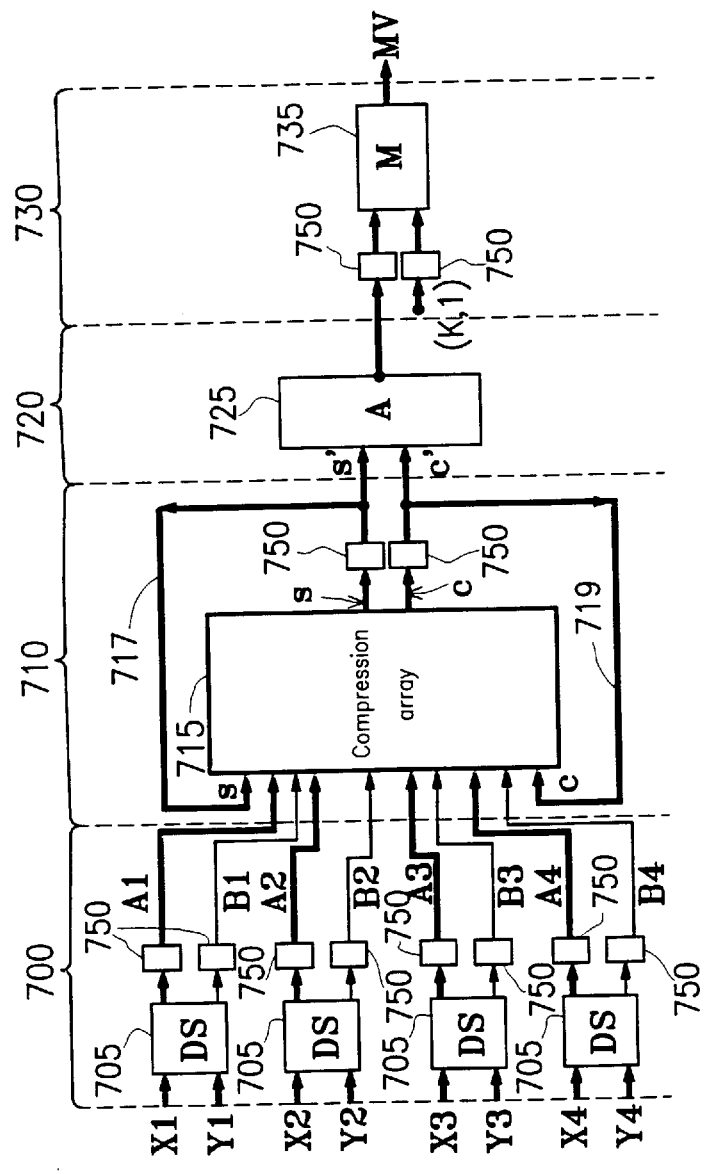
FIG. 5 is a block diagram of the hardware configuration of a four-channel tree-architecture design for video image processing, in accordance with a preferred embodiment of the invention.

FIG. 5 is a block diagram of the hardware configuration for a four-channel tree-architecture design for video image processing in accordance with a preferred embodiment of the invention. This depicted embodiment is applicable for use in video image processing schemes, and in particular to applications for real time digital image compression. Because of the use of many similar circuit elements arranged in a structurally repeating manner in the embodied tree-architecture configuration, it is especially suitable for implementation in a VLSI semiconductor device. In practical application, this tree-architecture can be constructed in a circuit device that receives image pixel data as an original block of a video image in order to have its movement vector determined. After a short time period, the video image has a search area defined for the processed image block, within which a number of potential compared image blocks are selected for comparison. The image pixel data of these selected compared image blocks are then provided to the tree-architecture of the invention as another set of inputs.

Figure 3:
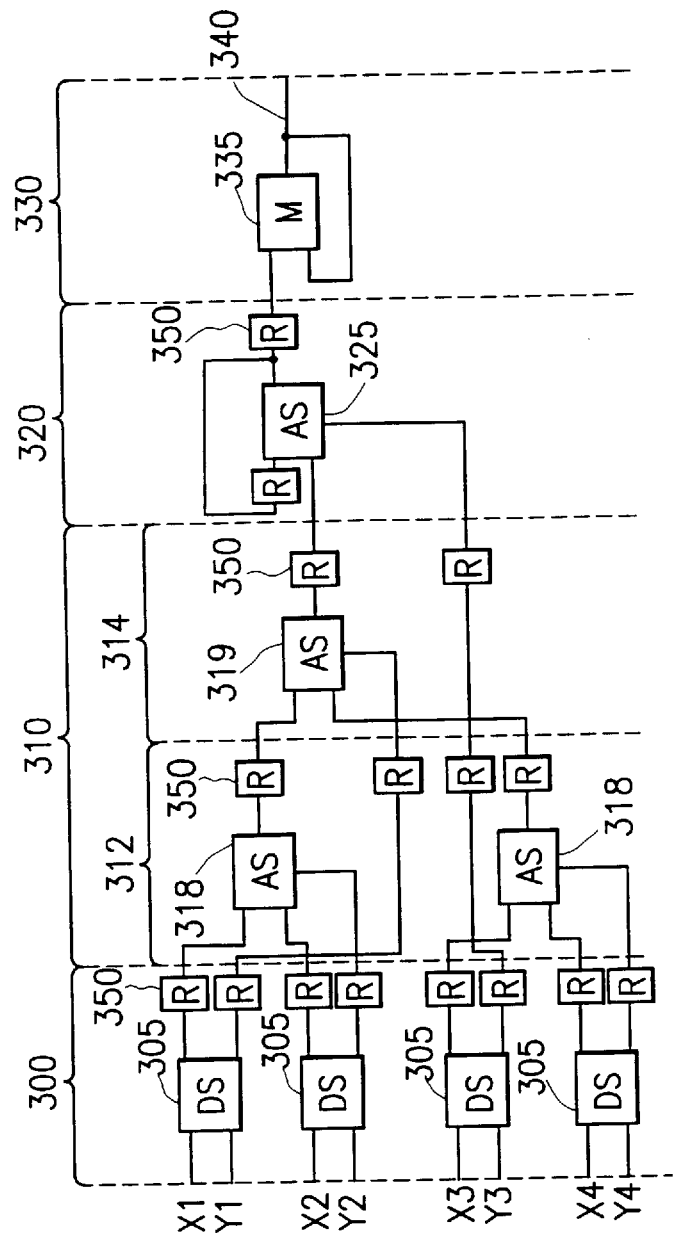
FIG. 3 is a block diagram of the hardware configuration of a four-channel conventional HSA tree-architecture design for video image processing.

As shown in FIG. 5, the process pipeline of the four-channel tree-architecture design has a total of four computational stages (compared to the conventional tree-architecture design of either FIG. 1 or FIG. 3, each of which has a total of five stages). The first stage in the process pipeline is a computational stage 700 that includes four computational members 705 arranged in parallel. Each of the four computational members 705 has two inputs, one of which receives the original image block pixel data, the other of which receives pixel data from the compared image block. The original and compared image block pixel data is received from corresponding locations.

For example, the four computational members 705 receive the four sets of pixel data input simultaneously. X1, X2, X3, and X4 are pixel data from the original image block, while Y1, Y2, Y3 and Y4 are pixel data from the compared image block at the corresponding locations. Thus, the first pair of original/compared pixel data X1 and Y1 is provided to one of the computational members 705 for processing, while the second pair X2 and Y2 of pixel data is provided to another computational member 705, and so on, as shown in FIG. 5.

The computational member 705 used to process the original and compared image pixels can be similar to the one shown in FIG. 4 and described above. As schematically shown in the drawing, each of the computational members 705 has a pair of output signals, one of which is the temporary Z" output for the value |X−Y| and the other of which is the sign bit data $z_{n-1}$ In FIG. 5, temporary |X−Y| data for the four channels are designated as $A_1, A_2, A_3$, and $A_4$, and the sign bit data $z_{n-1}$ are designated as $B_1, B_2, B_3$, and $B_4$, respectively.

Outputs of each of the computational members 705 in the first pipeline stage 700 of the tree-architecture are then provided to a data compression array in the second stage, the data compression stage 710. Essentially, the first stage 700 in the process pipeline processes to a point equivalent to obtaining an un-signed |X−Y| value, as the sign bit data $z_{n-1}$ is calculated into the evaluation of the absolute value |Z| in a later stage of the process pipeline, as mentioned above.

Note, however, that register members 750 are connected at the outputs of the computational members 705 in the computational stage 700. As described above, this is necessary for proper control of the synchronized pipeline clock timing, in order to obtain correct process results.

Then, in the data compression stage 710, a compression array 715 receives as inputs the A1, B1, A2, B2, A3, B3, and A4, B4 output pairs from the four computational members 705, respectively. The compression array 715 also has a pair of feedback lines connected through corresponding registers 750 from the output thereof The compression array 715 sums together the temporary absolute value data A1, A2, A3, and A4, the corresponding data sign bits B1, B2, B3, and B4, and the carry-in input of the summation in the previous clock cycle for the four channels in the pipeline. The result of the summation operation performed by the compression array 715 is buffered by the register 750 and includes a summation output S and a carry-out output C. A compression array 715 suitable for performing this operation can be a full-adder array or a 4/2-ratio compression array. Examples of detailed circuitry structure utilized to implement the compression array 715 will be described in the following paragraphs.

When the amount of pixel data of the subject image block is too great to be processed in one passage through the four channel pipeline of FIG. 5, intermediate compression result data S and C are buffered at registers 750 at the output of the compression array 715 and are fed back to inputs of the compression array 715 itself as the S and C inputs, respectively, to be summed in the subsequent clock cycle. This feedback routine can be repeated until all pixel data are accounted for. At this stage, the resultant data is provided to the next pipeline stage 720 as data S' and C', since the result of the circuitry implementation of equation (1), which involves the repeated cyclic summation operation outlined above, has been determined.

In the subsequent process pipeline stage, namely the summation stage 720, an adder 725 is used to perform the necessary operation. In effect, the summation stage 720 sums the temporary data S' and C' together, and provides the sum to the next pipeline process stage.

The fourth pipeline process stage in the embodied tree-architecture design is minimization stage 730. A minimum value evaluator member 735 determines a minimum value among the data generated by the summation stage 720. During each pipeline processing cycle, the summation result provided by the summation stage 720 is compared with a current minimum value held in the minimum value evaluator member 735. Essentially, the minimization stage 730 selects a minimum value by comparing between the calculated image pixel MAE for each processed image block to that of the compared image. Whichever is smaller is selected and stored as the minimum value. Once comparisons for the image blocks in the search area of the compared image block are complete, the relative image shift in the image block having the minimum MAE is identified as the movement vector MV of the processed original image. Thus, output of the process pipeline stage 730 is the result of equation (2) set forth above.

Practically, image blocks of 16×16 pixels are commonly applied to the hardware configuration for obtaining the movement vector when processing video image. Pixel data having a format of eight bits are generally sufficient in most cases to properly convey the S and C data required for video image pipeline processing using the tree-architecture of the invention. The following paragraphs describe a preferred embodiment of the full-adder array used to construct the tree-architecture of the invention. As mentioned above, since an 8-bit pixel data format is used, a 16-bit data string internal to the full-adder array is necessary. This is based on the assumption that 16×16 image blocks to be processed by passage through the four-channel tree-architecture of FIG. 5 would take at least 64 ($2^6$) passes through the process pipeline.

Figure 6A:
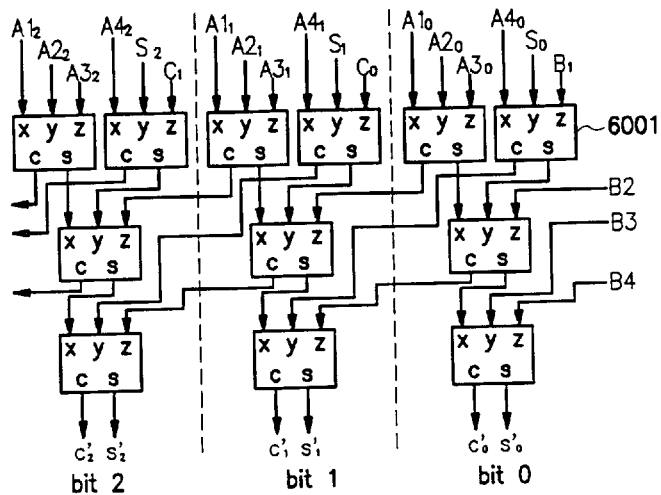
FIGS. 6A, 6B, and 6C are schematic diagrams of constituent portions of a first preferred embodiment of the compression array of the invention.
Figure 6B:
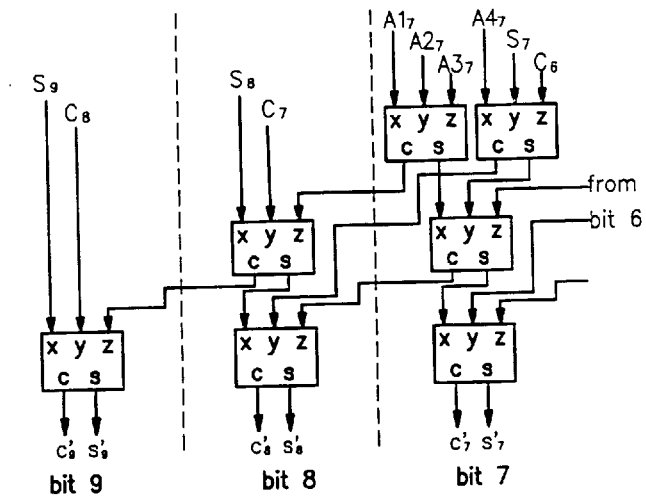
Figure 6C:
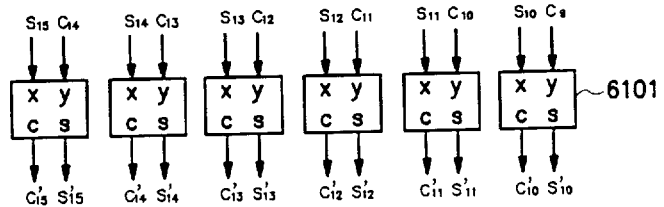

FIGS. 6A, 6B, and 6C respectively depict portions of a complete adder array arrangement to be utilized as the digital electronic circuitry elements for producing the 16-bit results of the embodied tree-architecture design of the invention. Essentially, these digital electronic circuitry elements are used to construct the compression array 710 of the tree-architecture of FIG. 5. The adder array includes full adders 6001 as shown in FIGS. 6A and 6B, and half adders 6101 as shown in FIG. 6C. The full adder 6001 is a basic binary adder having three operand inputs X, Y, and Z, as well as a summation output S and a carry-out output C, as shown in the drawing. As persons skilled in the art will appreciate, the three inputs X, Y, and Z are the two add operands and one carry-in operand, respectively, as is commonly annotated in related literature. The half adder 6101 is a conventional half adder, which does not include a carry-in input.

In this full-adder array embodiment, the original image pixel data A1, A2, A3, and A4 may be expressed as $\{A1_7, A1_6, \ldots, A1_0\}$, $\{A2_7, A2_6, \ldots, A2_0\}$, $\{A3_7, A3_6, \ldots, A3_0\}$, and $\{A4_7, A4_6, \ldots, A4_0\}$, respectively. Likewise, the intermediate summation S and carry-out C data can be expressed as $\{S_{15}, S_{14}, \ldots, S_0\}$ and $\{C_{15}, C_{14}, \ldots, C_0\}$, respectively.

As shown in FIG. 6A, each of the three least significant bits (LSB) 0, 1, and 2 of the full-adder array is implemented in circuitry having the same hardware configuration. Essentially, a total of four full adders 6001 are used to construct the sub adder array for each of the three LSB. For example, in the case of bit 0, two full adders 6001 are arranged in parallel at the top level to provide a total of six inputs to accommodate four LSB of data A1, A2, A3, and A4, namely bits $A1_0$, $A2_0$, $A3_0$, and $A4_0$, respectively, the LSB of the S data, namely $S_0$, and the single bit of data B1. Two of the four summation outputs from the two full adders at the top level, that is, the two S outputs, are provided to two of the three inputs of the full adder at the center level. The other two outputs, that is, the carry-out outputs, are relayed to the sub adder array cascaded at the center and bottom levels of the stage for bit 1. A third input of the center-level full adder for bit 0 receives a single bit of data B2. Then, at the bottom level of the sub adder array for bit 0, another full adder receives the summation output S of the center-level full adder, while the other two inputs thereof receive single bits of data B3 and B4, as shown in the drawing. Summation S and carry-out C outputs of this bottom-level full adder form the LSB output of the compression array 710. In essence, they are summation output $S'_0$ and carry-out output $C'_0$ of the processed pipeline.

In the second and third LSB, that is, bits 1 and 2, respectively, an arrangement similar to that described above for data bit 0 is utilized to produce second and third LSB outputs of the compression array 710, namely, output pairs $S'_1$, $C'_1$ and $S'_2$, $C'_2$, respectively. Inputs in the second LSB circuitry corresponding to those receiving B2, B3, and B4 in the LSB subarray receive carry-out outputs from the adders of bit 0. Meanwhile, the input in the second LSB circuitry corresponding to that receiving B1 in the LSB subarray receives the $C_0$ feedback of the compression array itself. The third LSB bit circuitry is similarly arranged. This similar hardware circuitry configuration is repeated for subsequent sub adder arrays up to and including bit 6, although the subarrays for bits 3 through 6 are not shown in the drawing.

FIG. 6B shows that the sub adder array for bit 7 has a hardware configuration that is very similar to that of bits 0–6. The carry-out outputs of three of the four full adders, however, are provided to a sub adder array at the very next cascaded stage which has a different hardware configuration. As shown in the drawing, the bit 8 circuit configuration includes two full adders, while the bit 9 circuit configuration has one single full adder.

As shown in FIG. 6C, the sub adder arrays for bits 10–15 have basically the same hardware circuit configuration. Essentially, the hardware circuitry of each of these six subarrays is a simple half adder 6101 that adds the S and C data bits as shown in the drawing. That is, each half adder 6101 receives as inputs the sum output from that stage and the carry-out output from the previous stage.

Figure 7A:
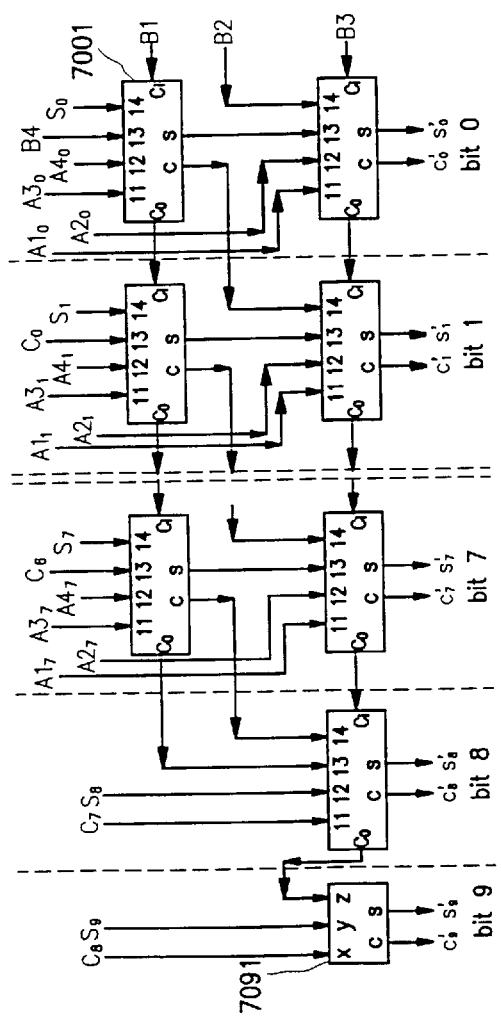
FIGS. 7A and 7B are schematic diagrams of constituent portions of a second preferred embodiment of the compression array of the invention.
Figure 7B:
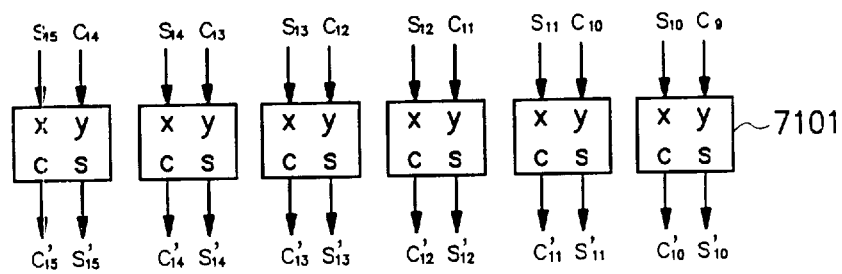

FIGS. 7A and 7B show constituent portions of the digital electronic circuitry included in a second embodiment of the compression array 710 for the tree-architecture design of FIG. 5. The circuitry depicted in FIGS. 7A and 7B is built around an array of 4/2-ratio compressors. Data corresponding to those in the embodiment of FIGS. 6A, 6B, and 6C have the same reference numeral designations in FIGS. 7A and 7B. Three types of adders are included in this compression array. That is, 4/2-ratio compressors 7001, a full adder 7091, and half adders 7101 are used as the building blocks for the compression array.

Essentially, a 4/2-ratio compressor 7001 is equivalent to two parallel-connected full adders 6001 described above in relation to the first embodiment of FIGS. 6A, 6B, and 6C. As shown in the drawing, each of the 4/2-ratio compressors 7001 has five inputs I1, I2, I3, I4, and carry-in Ci, as well as three outputs C, S, and carry-out Co. Operation on the five inputs by each 4/2-ration compressor produces the three outputs C, S, and Co. The C output functions as the second LSB sum output bit, and the S output as the LSB sum output bit.

Thus, with reference to FIG. 7A, it can be observed that the combination of the two 4/2-ratio compressors 7001 connected in series for each of the LSB bits 0–7 provides the nine inputs needed to accommodate the data bits $A1_0$, $A2_0$, $A3_0$, $A4_0$, $S_0$, B1, B2, B3, and B4, as in the case of the first embodiment shown in FIGS. 6A, 6B, and 6C. Thus, it can be easily seen that the circuitry hardware configuration shown in FIGS. 7A and 7B is in fact equivalent to that shown in FIGS. 6A, 6B, and 6C. Specifically, similar to the case of the configuration shown in FIGS. 6A and 6B, each of bits 0–7 of the 4/2-ratio compressor-based embodiment has two cascade-connected 4/2-ratio compressors, connected to function as an equivalent of the four full adder configuration. Bit 8 is a single 4/2-ratio compressor, corresponding to the two full-adder configuration shown in FIG. 6B. Bit 9 is the same as the full adder shown in FIG. 6B, and bits 10–16 are the same as the half adders shown in FIG. 6C. Thus, the 4/2-ratio compressor-based compression array, which is similar to the configuration of the first embodiment shown in FIGS. 6A, 6B, and 6C, receives inputs A1, A2, A3, A4, B1, B2, B3, and B4, as well as the feedback S and C data, so as to generate the 16-bit S' and C' data sets.

In substantial applications, the compression array 710 (FIG. 5), whether built around either full adders or 4/2-ratio compressor elements can be compared to conventional implementations in terms of the total number of logic gates to evaluate the implementation cost. When the full adder implementation is employed, one full adder accounts for seven logic gates, while one half adder accounts for four. Thus, a four-channel full-adder-based compression array requires a total of 269 logic gates to construct. On the other hand, the signal propagation time delay through one full adder is equivalent to that for a series connection of two logic gates. The full adder-based compression array has a configuration of three levels of cascade connection of these full adders, therefore a total time delay of six logic gates is required, although this time latency is smaller than the time delay in the minimum value evaluator member at the last stage of the tree-architecture shown in FIG. 5.

In contrast, the compression array 710 of FIG. 5 built around the 4/2-ratio compressor elements has an equivalent logic gate count of 218 and a time latency of six logic gates. This is because a 4/2-ratio compressor element includes 11 logic gates, and each element has a signal propagation delay equal to that of three series logic gates. Time latency in such a 4/2-ratio compressor-based compression array is still smaller than that in the minimum value evaluator member connected at the last stage of the tree-architecture design.

Thus, based on either embodiment of the hardware circuitry configuration shown in FIGS. 6A, 6B, and 6C and FIGS. 7A and 7B, it is possible to construct a compression array for the tree-architecture design of FIG. 5 that is completely arranged in a single process pipeline having a total of four pipeline stages. With an architecture having more than 32 channels arranged in two process pipelines, the total number of processing pipeline stages is five.

Table 1 below outlines a comparison between compression array embodiments built around full adders and 4/2-ratio compressor elements. In the table, m represents the total number of channels established in the process pipeline. $N_{FA}$ and $N_{4/2}$ represent the total number of stages in the pipeline for the full adder- and 4/2-ratio compressor-based configurations, respectively. $D_{FA}$ and $D_{4/2}$ represent the time delay internal to the pipeline for the full adder- and 4/2-ratio compressor-based configurations, respectively. Note that $D_{FA}$ and $D_{4/2}$ are expressed in units of the basic time delay amount, $\tau$, for one two-input NAND logic gate.

TABLE 1

| m | $N_{FA}$ | $D_{FA}$ | $N_{4/2}$ | $D_{4/2}$ |
|---|---|---|---|---|
| 4 | 3 | $6\tau$ | 2 | $6\tau$ |
| 8 | 5 | $10\tau$ | 3 | $9\tau$ |
| 16 | 6 | $12\tau$ | 4 | $12\tau$ |
| 32 | 8 | $16\tau$ | 5 | $15\tau$ |
| 64 | 10 | $20\tau$ | 6 | $18\tau$ |
| 128 | 11 | $22\tau$ | 7 | $21\tau$ |

An examination of Table 1 shows that as the total number of channels increases, neither the number of stages nor the time delay in either the full adder-based or the 4/2-ratio compressor-based configuration experiences a proportional increase. The increase of these parameters is actually more gradual than the channel number increase. For example, while the number of channels increases from four to 128, an increase of 3,200%, the total number of process stages increases by less than 370% (11/3), and the time latency increase is also than 370% (22/6).

Table 2 below compares the time latency characteristics of the tree-architecture of the invention to that of the conventional configuration shown in FIG. 3. In the table, $T_p$ is a basic operational clock cycle time unit. $T_{AS}$, $T_{FA}$, and $T_{4/2}$ are time delays in the process pipeline for the conventional architecture of FIG. 3, the full adder-based configuration, and the 4/2-ratio compressor-based compression array, respectively.

TABLE 2

| m | $T_{AS}$ | $T_{FA}$ | $T_{4/2}$ |
|---|---|---|---|
| 4 | $5T_p$ | $4T_p$ | $4T_p$ |
| 8 | $6T_p$ | $4T_p$ | $4T_p$ |
| 16 | $7T_p$ | $4T_p$ | $4T_p$ |
| 32 | $8T_p$ | $5T_p$ | $5T_p$ |
| 64 | $9T_p$ | $5T_p$ | $5T_p$ |
| 128 | $10T_p$ | $5T_p$ | $5T_p$ |

The data of Table 2 show that as the total number of channels increases, both compression array designs of the invention experience a much smaller time latency than the conventional design, approximately half the time latency over the subject range.

Table 3 below compares the estimated semiconductor integrated circuit device surface area of a circuit utilizing the tree-architecture of the invention is implemented with the surface area of a circuit utilizing the conventional architecture shown in FIG. 3. In the Table $A_{FA}$ represents the estimated surface area for the tree-architecture utilizing the full adder-based compression array shown in FIGS. 6A, 6B, and 6C. $A_{AS}$ represents the surface area for the conventional design.

TABLE 3

| m | $A_{FA}$ ($\mu m^2$) | $A_{AS}$ ($\mu m^2$) | $A_{AS}/A_{FA}$ |
|---|---|---|---|
| 4 | 1064 × 484 | 1064 × 665 | 1.37 |
| 8 | 1324 × 759 | 1761 × 966 | 1.69 |
| 16 | 2042 × 1026 | 2630 × 1427 | 1.79 |

The data of Table 3 shows that the device surface area required for the conventional implementation is always larger than that for the circuit of the present invention built around the full adder-based compression array. And, as the channel number increases, the $A_{AS}/A_{FA}$ ratio increases as well. This indicates that as the channel number increases, the surface area requirement for the device increases as well, but to a lesse extent when utilizing the circuit architecture of the invention.

Thus, the invention is characterized by at least the following advantages. First of all, as the number of channels in the process pipeline architecture based on the compression array of the invention increases, the total number of process stages is smaller than the number required by conventional architectures. This reduction results directly in an increased processing efficiency. In other words, based on the same number of processing channels and the same operating clock frequency, the architecture of the invention allows operation at a higher data throughput than with conventional systems.

Secondly, regardless of whether the full adder-based or 4/2-ratio compressor-based compression array is utilized, the total number of equivalent logic gates of the architecture of the invention is always smaller than the number used in the conventional parallel adder-based accumulation tree-architecture design. Therefore, when implemented in a physical semiconductor device, the dimensions are always far smaller when using the architecture of the invention.

While the invention has been described by way of example and in terms of preferred embodiments, it is to be understood that the invention is not limited to the disclosed embodiments. To the contrary, it is intended to include various modifications and similar arrangements. Therefore, the scope of the appended claims should be accorded the broadest interpretation so as to encompass all such modifications and similar arrangements.

What is claimed is:

1. An apparatus for implementing block matching for motion estimation in a video image processing system, wherein the apparatus receives pixel data from an original image block and pixel data from a compared image block selected from among a plurality of possible compared image blocks for determining a movement vector, the apparatus comprising:

a computational stage for receiving the original image block pixel data and the compared image block pixel data and for generating corresponding difference data and sign data;

a compression stage, including a compression array for receiving said difference data and said sign data, for generating compressed summation data and compressed sign data;

a summation stage for receiving said compressed summation data and said compressed sign data, and for generating a mean absolute error for said original image block pixel data and said compared image block pixel data; and a minimization stage for receiving said mean absolute error for each said selected compared image block and for determining a minimum mean absolute error from among mean absolute errors calculated for different compared image blocks;

wherein said compression array includes a plurality of adder elements arranged in a multi-level arrangement such that all adder operand inputs and carry-in inputs of said plurality of adder elements is disposed to receive an input signal level.

2. The apparatus of claim 1, wherein said adder elements in said compression array include a plurality of full adders and a plurality of half adders.

3. The apparatus of claim 2, wherein said difference data represents a difference between said original image block pixel data and said corresponding compared image block pixel data, and wherein said sign data represents sign information of said difference data.

4. The apparatus of claim 1, wherein said adder elements in said compression array include a plurality of compressor elements, a plurality of full adders, and a plurality of half adders.

5. The apparatus of claim 4, wherein said compressor elements are 4/2-ratio compressors.

6. The apparatus of claim 5, wherein said compression array receives said compressed summation data and compressed sign data as feedback inputs.

7. The apparatus of claim 1, wherein said computational stage further comprises a plurality of computational members, wherein said computational members are arranged in parallel and each has a pair of inputs, wherein one of said pair of inputs is connected to receive said original image block pixel data and the other of said pair of inputs is connected to receive corresponding compared image block pixel data, and wherein said computational members produce corresponding difference data and sign data.

8. The apparatus of claim 7, wherein said compression array receives all said difference data and said sign data generated by said plurality of computational members, and said compression array adds all said input difference data and said sign data to generate said compressed summation data and compressed sign data.

9. An apparatus for implementing block matching for motion estimation in a video image processing system, wherein the apparatus receives pixel data from an original image block and pixel data from a compared image block selected from among a plurality of possible compared image blocks for determining a movement vector, the apparatus comprising:

a computational stage including a plurality of computational members, wherein said computational members are arranged in parallel and each has a pair of inputs, wherein one of said pair of inputs is connected to receive said original image block pixel data and the other of said pair of inputs is connected to receive said corresponding compared image block pixel data, and wherein said computational members produce corresponding difference data and sign data, said difference data representing a difference between said original image block pixel data and said corresponding compared image block pixel data, and said sign data representing sign information of said difference data;

a compression array for receiving said difference data and said sign data generated by said plurality of computational members, for adding said difference data and said sign data to generate compressed summation data and compressed sign data;

a summation stage for receiving said compressed summation data and said compressed sign data, and for generating a mean absolute error for said original image block pixel data and said compared image block pixel data; and a minimization stage for receiving said mean absolute error for each said selected compared image block;

wherein said compression array includes a plurality of adder elements arranged in a multi-level arrangement such that all adder operand inputs and carry-in inputs of said plurality of adder elements is disposed to receive an input signal level.

10. The apparatus of claim 9, wherein said adder elements in said compression array include a plurality of full adders and a plurality of half adders.

11. The apparatus of claim 9, wherein said adder elements in said compression array include a plurality of compressor elements, a plurality of full adders, and a plurality of half adders.

12. The apparatus of claim 11, wherein said compressor elements are 4/2-ratio compressors.

* * * * *